(12) United States Patent
Golden et al.

(10) Patent No.: US 7,947,170 B2
(45) Date of Patent: May 24, 2011

(54) APPARATUS FOR TREATMENT OF CHEMICAL MECHANICAL POLISHING FLUID

(75) Inventors: Josh H. Golden, Santa Cruz, CA (US); Peter I. Porshvev, San Jose, CA (US); Michael R. Woolston, San Jose, CA (US); Cormac Kissane, San Mateo, CA (US)

(73) Assignee: Applied Materials, Inc., Santa Clara, CA (US)

( * ) Notice: Subject to any disclaimer, the term of this patent is extended or adjusted under 35 U.S.C. 154(b) by 689 days.

(21) Appl. No.: 11/845,625

(22) Filed: Aug. 27, 2007

(65) Prior Publication Data

US 2008/0047901 A1 Feb. 28, 2008

Related U.S. Application Data

(60) Provisional application No. 60/840,167, filed on Aug. 25, 2006.

(51) Int. Cl.
*B01D 36/02* (2006.01)
(52) U.S. Cl. ....... 210/85; 210/195.1; 210/196; 210/202; 210/205; 210/269; 210/502.1
(58) Field of Classification Search ............... 210/167.3, 210/167.31, 171, 195.1, 196, 202, 205, 260, 210/266, 502.1, 85, 93, 269
See application file for complete search history.

(56) References Cited

U.S. PATENT DOCUMENTS

| | | | |
|---|---|---|---|
| 4,740,488 A | 4/1988 | Fogler et al. | |
| 5,244,570 A * | 9/1993 | Smith, II | 210/205 |
| 5,604,264 A * | 2/1997 | McQuigg | 521/38 |
| 5,827,362 A | 10/1998 | McLeod | |
| 5,922,206 A * | 7/1999 | Darlington et al. | 210/693 |
| 6,106,728 A * | 8/2000 | Iida et al. | 210/743 |
| 6,238,571 B1 | 5/2001 | Olmez et al. | |
| 6,346,195 B1 * | 2/2002 | Filson et al. | 210/668 |
| 7,048,857 B2 * | 5/2006 | Jangbarwala | 210/652 |
| 7,542,132 B2 | 6/2009 | Fang et al. | |
| 7,601,264 B2 | 10/2009 | Golden et al. | |
| 7,651,384 B2 | 1/2010 | Golden et al. | |
| 2001/0039077 A1 | 11/2001 | McTeer | |
| 2002/0104803 A1 | 8/2002 | Filson et al. | |
| 2005/0076581 A1 | 4/2005 | Small et al. | |
| 2006/0021943 A1 * | 2/2006 | Gannon et al. | 210/663 |

OTHER PUBLICATIONS

PCT International Search Report and Written Opinion dated Jan. 25, 2008 for International Application No. PCT/US2007/76890. (APPM/010814 PCT).

* cited by examiner

*Primary Examiner* — Matthew O Savage
(74) *Attorney, Agent, or Firm* — Patterson & Sheridan, LLP (57) ABSTRACT

Embodiments of the invention generally provide a method and an apparatus for treating waste effluents from substrate polishing processes, such as from an electrochemical mechanical polishing (ECMP) process. In one embodiment, a method for treating a waste effluent mixture generated during a substrate process is provided which includes flowing a waste effluent comprising chelated metal complexes from a substrate process system, combining an oxidizing agent and the waste effluent to produce free chelators, flowing the waste effluent through an organoclay media and an activated carbon media to remove the free chelators, and flowing the waste effluent through an anion exchange resin to remove metal ions and produce a waste water.

11 Claims, 6 Drawing Sheets

APPARATUS FOR TREATMENT OF CHEMICAL MECHANICAL POLISHING FLUID

CROSS-REFERENCE TO RELATED APPLICATIONS

This application claims benefit of U.S. Ser. No. 60/840,167 (APPM/010814L), filed Aug. 25, 2006, which is incorporated herein by reference.

BACKGROUND OF THE INVENTION

1. Field of the Invention

Embodiments of the invention generally relate to a method and an apparatus for treating of substrate polishing fluids, such as electrochemical mechanical polishing fluids.

2. Description of the Related Art

In the fabrication of integrated circuits, displays, and other electronic devices, multiple layers of conductive, semi-conductive, and dielectric materials are deposited on or removed from a feature side of a substrate. During the fabrication process, electrochemical mechanical polishing (ECMP) and chemical mechanical polishing (CMP) are performed to polish or planarize the feature side of the substrate, and to remove defects, such as scratches, surface roughness, and contaminants from the substrate.

ECMP and CMP are two processes used to remove materials from the feature side of the substrate. In a typical CMP process, the substrate is urged against a processing pad and a fluid medium is provided at the interface between the processing pad and the substrate. The fluid medium may contain abrasive particles suspended in the fluid medium containing a chemical etchant, among other chemicals. Similarly, in a typical ECMP process, the substrate is urged against a processing pad and a fluid medium is provided at the interface between the processing pad and the substrate. In this case, the fluid medium may function as an electrolyte to facilitate electrochemical dissolution of materials on the substrate, as one or both of the substrate and processing pad are coupled to electrical power.

In both of these processes, an effluent of used processing fluid may be released from the polishing process. The effluent may contain abrasive particles, metal particles, metal ions, polishing byproducts, reagents, suspension liquid, and solvents. The effluent may also contain organic and inorganic compounds, buffering agents, oxidizers, surfactants, chelating agents, etchants, corrosion inhibitors, acids, salts, complexing agents, among other substances. The metal particles and/or metal ions may include copper, aluminum, tungsten, and other metals that may be used to form electronic devices on substrates.

If a user of an ECMP or CMP process desires to dispose of this effluent, these substances need to be removed prior to disposal. Particularly, the Environmental Protection Agency (EPA) requires removal of hazardous materials from these effluents prior to disposal. In some applications, a user may desire to capture at least a portion of the effluent and treat the effluent for reuse in the processing system.

There have been some systems developed for treating processing effluents, and/or systems for removal or abatement of substances from the processing effluent prior to disposal. However, these systems are typically provided to treat and/or facilitate removal of a particular portion of the effluent such that the processing effluent is treated in a piecemeal manner. For example, ion removal may be provided by an ion exchange medium, but the presence of chemical complexes and/or insoluble compounds in the effluent may disallow ion exchange. Thus, the effluent must be filtered and/or pretreated in another treatment apparatus prior to introduction to the ion exchange medium. Another disadvantage of the treatment stems from the effluent treatment devices being stand-alone or "off-tool" devices requiring transport of the effluent to various separate devices and intermittent storage of the effluent between treatments, which may increase downtime of the tool and/or increase operating costs of the system.

Therefore, there is a need for a method and integrated apparatus for point of use treatment of processing effluent from a polishing system.

SUMMARY OF THE INVENTION

Embodiments of the invention generally provide a method and an apparatus for treating waste effluents of polishing fluids from substrate processes, such as from an electrochemical mechanical polishing (ECMP) process. In one embodiment, a method for treating a waste effluent mixture generated during a substrate process is provided which includes flowing a waste effluent comprising chelated metal complexes from a substrate process system, combining an oxidizing agent and the waste effluent to produce free chelators, flowing the waste effluent through an organoclay media and an activated carbon media to remove the free chelators, and flowing the waste effluent through an anion exchange resin to remove metal ions and produce a waste water.

In another embodiment, a method for treating a waste effluent mixture generated during a substrate process is provided which includes flowing a waste effluent comprising chelated metal complexes from a substrate process system, flowing the waste effluent through an organoclay media and an activated carbon media to remove the chelated metal complexes or free chelators, and flowing the waste effluent through an ion exchange resin.

The method provides that the oxidizing agent may contain hydrogen peroxide or ozone and may be radiated by ultraviolet radiation separate from or combined with the waste effluent. In one embodiment, the waste effluent is flown through the organoclay media and subsequently through the activated carbon media. In another embodiment, the waste effluent is flown through the activated carbon media and subsequently through the organoclay media. In another embodiment, the waste effluent is flown through a mixture of the organoclay media and the activated carbon media. In one example, the waste effluent contains a polishing solution and the chelated metal complexes contains copper and EDTA. The method further provides that the waste effluent may be kept separate from rinse water flowing from the substrate process system and that the waste effluent may be filtered through a filter media prior to the combining the waste effluent and the oxidizing agent.

In another embodiment, an apparatus for treating a waste effluent mixture generated during a substrate process is provided which includes a conduit system configured to be coupled to a substrate process system, an oxidizing agent cell coupled to the conduit system and in fluid communication with an oxidizing agent source. The apparatus further contains an organoclay filter cell coupled to the conduit system and comprising an organoclay media, an active carbon filter cell coupled to the conduit system and comprising an active carbon media, and a resin column coupled to the conduit system and comprising an anion exchange resin. In one example, a filter media may be coupled to the conduit system and in fluid communication between the substrate process system and the organoclay filter cell. In another example, an ultraviolet radiation source is configured to radiate the oxidizing agent source or the oxidizing agent cell. In another example, the oxidizing agent cell may be positioned upstream from the organoclay filter cell. In another example, the organoclay filter cell is positioned upstream from the activated carbon filter cell.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the invention generally comprises a method and an apparatus for treating a processing fluid used in a polishing module and/or a substrate processing system having one or more polishing stations, such as in an electrochemical mechanical polishing (ECMP) process. Embodiments described herein may also be implemented to treat used processing fluid in an electrochemical plating (ECP) process. A selected portion of used processing fluid, or effluent, may be delivered to a point-of-use (POU) treatment unit where the fluid may be treated.

Figure 1:
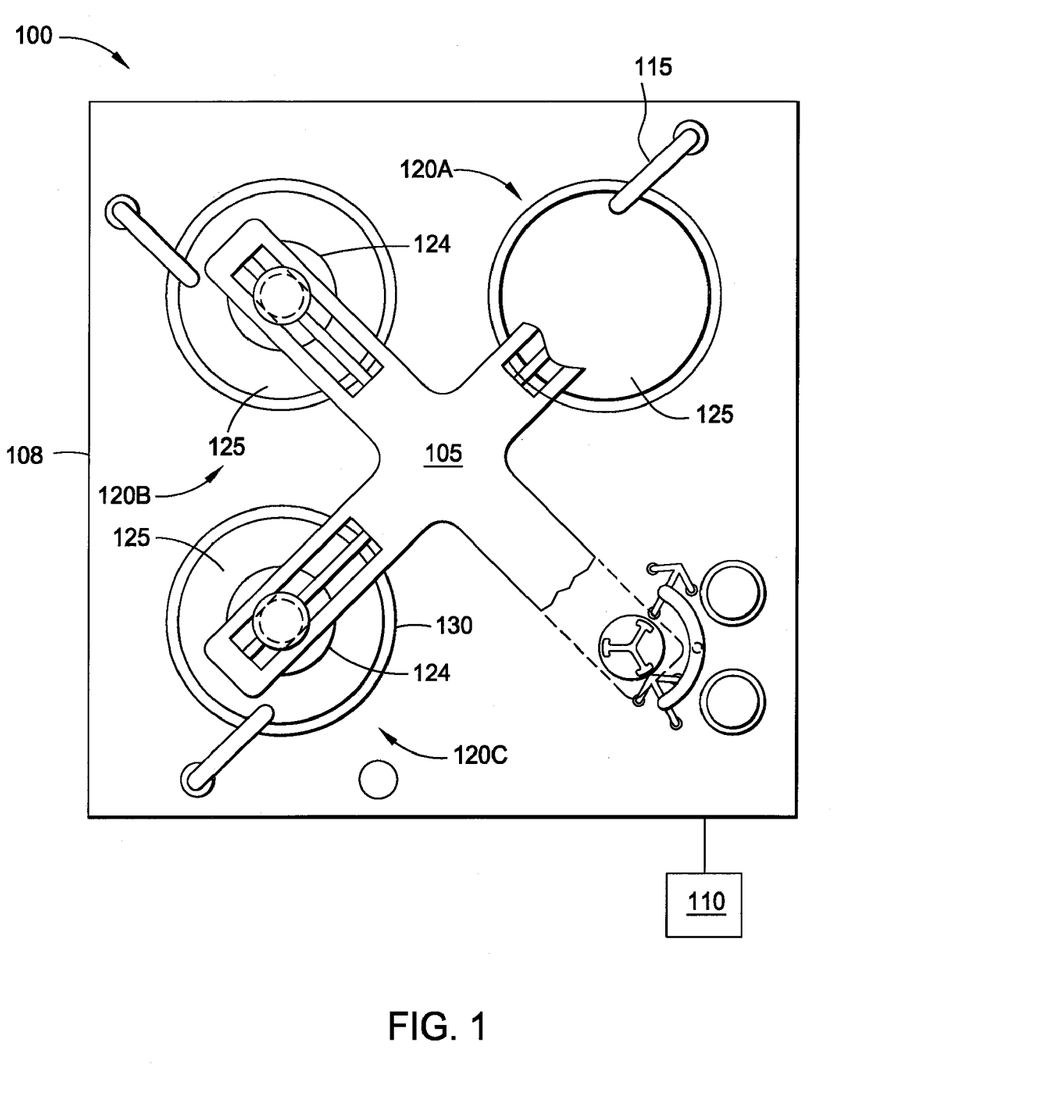
FIG. 1 illustrates a plan view of a processing system 100.

FIG. 1 is a top view of one embodiment of a portion of a processing system 100 adapted to remove materials from a feature side of a substrate. In one embodiment, the system 100 is configured to planarize or polish semiconductor substrates and generally includes a polishing module 108, which includes one or more polishing stations 120A-120C disposed therein. Each polishing station 120A-120C includes a platen 130 that supports a polishing material 125. During processing, a substrate is urged against the polishing material 125 by a substrate carrier head 124, and the platen 130 rotates to provide at least a portion of relative polishing motion between the substrate and the polishing material 125. Substrates are transported between stations in the carrier heads 124, which are disposed on a rotatable and indexable frame structure 105.

In the embodiment depicted in FIG. 1, the polishing module 108 includes a first polishing station 120A, a second polishing station 120B, and a third polishing station 120C. In one operational application, bulk removal of conductive material disposed on a substrate may be performed through an ECMP process at the first polishing station 120A. After the bulk material removal at the first polishing station 120A, the remaining conductive material is removed from the substrate at the second polishing station 120B through a multi-step ECMP process, wherein a portion of the multi-step process is configured to remove residual conductive material. A third material removal process may be performed at the third polishing station 120C, which may be a CMP process configured to remove barrier material disposed on the substrate. Although the system 100 is described as having two stations to perform an ECMP process, and one station to perform a CMP process, it is contemplated that stations 120A-120C may be adapted to perform either process, without limitation. Processing systems that may be adapted to benefit from embodiments described herein include REFLEXION®, REFLEXION® LK, REFLEXION® LK ECMP™, MIRRA MESA® polishing systems available from Applied Materials, Inc., located in Santa Clara, Calif., although other polishing systems may be utilized. Other polishing modules, including those that use other types of processing pads, belts, planarizing webs, or a combination thereof, and those that move a substrate relative to a polishing surface in a rotational, linear or other planar motion may also be adapted to benefit from embodiments of the invention.

A controller 110 is provided to facilitate control and integration of the modules of the system 100. The controller 110 may comprise a central processing unit (CPU), a memory, and support circuits. The controller 110 may be coupled to the various components of the system 100 to facilitate control of, for example, the polishing, cleaning, recycling/refurbishing, and transfer processes that are facilitated by and/or provided for the system 100.

A polishing fluid is provided to at least an upper surface of the polishing material 125 by a nozzle 115 disposed adjacent each platen 130, and each platen 130 may require a different fluid to provide enhanced polishing and/or removal of materials from the substrate. For example, polishing stations 120A and 120B may require a polishing fluid having properties to facilitate ECMP processes, and polishing station 120C may require a polishing fluid having properties to facilitate CMP processes.

Figure 2:
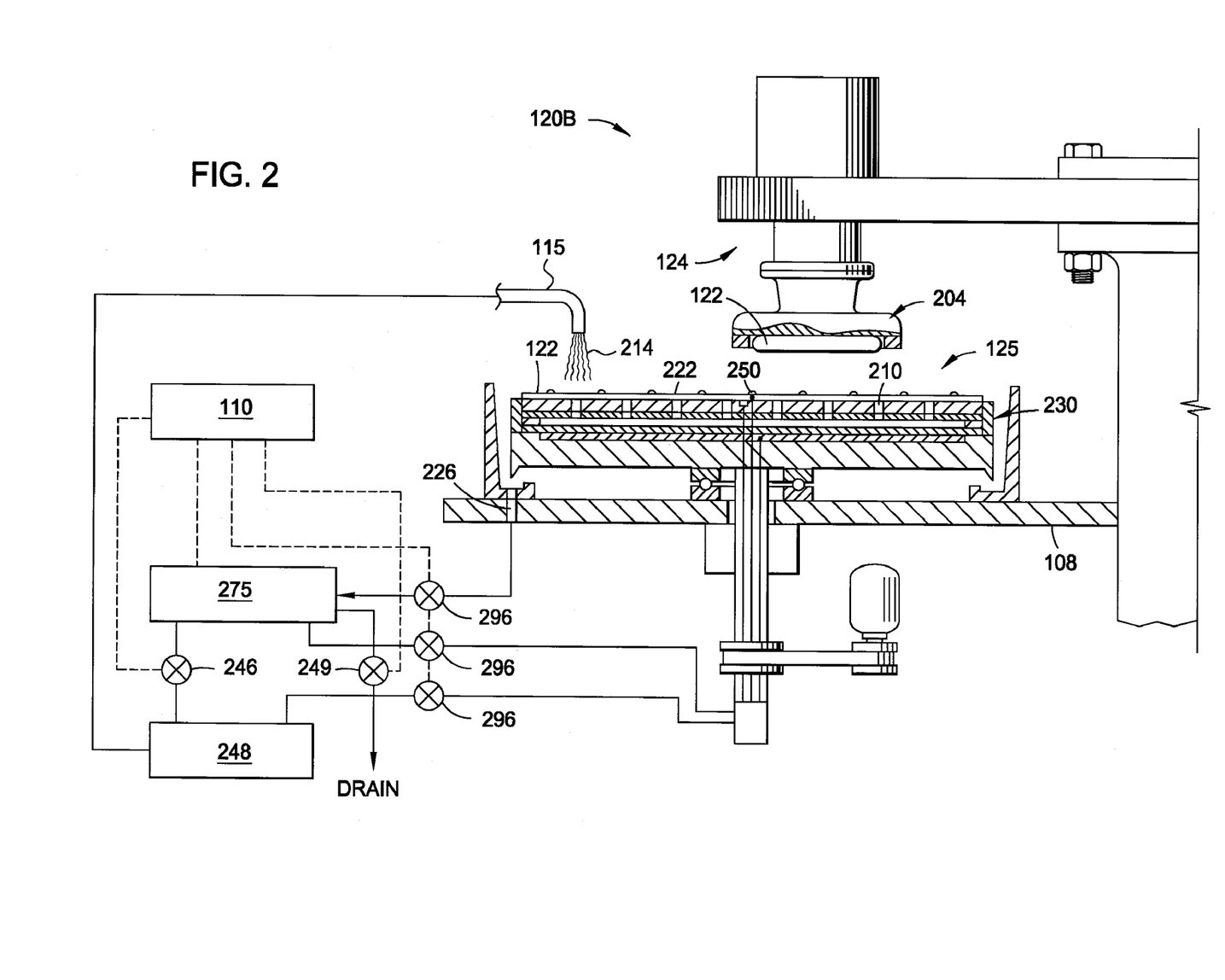
FIG. 2 depicts a sectional view of one embodiment of a polishing station.

FIG. 2 depicts a sectional view of one embodiment of a polishing station 120B. The polishing station 120B includes a platen assembly 230 having a polishing material 125 disposed therein. The polishing station 120B also includes a carrier head assembly 124 having a carrier head 204 that may be actuated toward the polishing station 120B such that a substrate 122 retained in the carrier head 204 may be disposed against a processing surface 218 of the polishing material 125 during processing.

In one embodiment, the polishing material 125 comprises a processing pad assembly 222 adapted for a CMP or ECMP process. The processing pad assembly 222 may be a single layer or include a stacked arrangement of various layers configured for hardness or flexibility. The processing pad assembly 222 may be made of dielectric materials, conductive materials, or combinations thereof. At least an upper surface of the processing pad assembly 222 may include particles 250 that may be made of a conductive or abrasive material adapted for ECMP or CMP processes. In one application, the processing pad assembly 222 is replaceable and may be retained to the platen assembly 230 by magnetic attraction, vacuum, fasteners, clamps, adhesives, and the like.

In the case of a processing pad assembly for a CMP process, the processing pad assembly 222 may be made of polymeric materials, such as polyurethane, polycarbonate, fluoropolymers, PTFE, PTFA, polyphenylene sulfide (PPS), or combinations thereof, and other polishing materials used in polishing substrate surfaces. In the case of a processing pad assembly for an ECMP process, the processing pad assembly may include an upper surface which is at least partially conductive. The upper surface may be made of conductive or dielectric polymers having conductive particles disposed therein. The upper surface may be disposed on an electrode, which is in closer proximity to the platen assembly 230. An insulation layer may be disposed between the upper surface and the electrode to facilitate electrical separation of the upper surface and the electrode, although passages 210 are formed from the upper surface to the electrode to facilitate electrical communication between the upper surface and the electrode via a processing fluid having electrolytic properties. Examples of processing pad assemblies that may be adapted to benefit from embodiments of the invention are described in commonly assigned U.S. Pat. No. 6,991,528 and U.S. Ser. No. 10/455,895, filed Jun. 6, 2003, and published as U.S. Pub. No. 2004-0020789, both of which are hereby incorporated by reference in their entirety.

The polishing fluid 214 that is used to facilitate processing of the substrate 122 may be provided by nozzle 115 to an upper surface of the processing pad assembly 222. Excess or used polishing fluid 214 may be contained in an enclosure surrounding the platen assembly 230, which channels a portion of the polishing fluid 214 to a drain 226. A point-of-use (POU) treatment unit 275 may be coupled to drain 226 by numerous valves 296, which may be opened and closed to control the flow of fluid 214 into and out of the POU treatment unit 298, the polishing station 120B, and a polishing fluid source 248 based upon instructions from the controller 110. As will be explained in greater detail below, the POU treatment unit 275 may be configured to remediate, analyze, dose, and combinations thereof, for the purpose of abatement or recycling of the polishing fluid 214 used in the polishing station 120B. Based on factors, such as a user's preference, or analytical results, the POU treatment unit 275 may recycle the fluid to the polishing station 120B, or expel treated fluid to a drain through valve 249. Examples of formulations and compositions of polishing fluids that may be used and treated are disclosed in U.S. Pat. Nos. 6,899,804 and 6,863,797, and U.S. Ser. No. 11/123,274, filed May 5, 2005, and published as U.S. Pub. No. 2005-0218010, which are hereby incorporated by reference in their entirety.

During or after a polishing process is completed, the processing pad assembly 222 and/or the platen assembly 230 may be rinsed with deionized water. The deionized water, if mixed with the polishing fluid, will dilute the polishing fluid and increase the volume of the polishing fluid to be treated. If the deionized water mixes with the polishing fluid, the deionized water may need to be separated from the polishing fluid. The deionized water may be separated from the polishing fluid using processes such as dialysis, reverse osmosis, and air stripping. To avoid polishing fluid dilution, a separate drain may be provided so that the polishing fluid and the rinsing deionized water will exit the polishing station through separate drains. A controller coupled with the polishing station 120B may ensure that the proper valves are open at the appropriate times to ensure that the deionized water rinse drains through the proper drain and the polishing fluid drains through the proper drain.

In one embodiment, the polishing fluid and the rinsing water flow through the same drain, which may be drain 226. Thus, rinsing water may be present in the drain when the used polishing fluid flows into the drain. In order to ensure that the used polishing fluid is as free of rinsing water as possible, a selected portion (i.e., a pure cut) of used polishing fluid may be taken from the polishing fluid drained from the polishing station 120B. The used polishing fluid may be broken into three separate portions. The first portion is the initial ECMP fluid drained out of the station that passes through the drainage conduit through which the rinse waters have flowed. Because residual rinse water may be present in the conduit, the first portion may have excess rinse water. The second portion is the last portion of ECMP fluid drained out of the station. As the ECMP fluid is drained, rinse waters may be started to speed up substrate throughput. As such, it may be possible for rinse water to be present in the last portion as it drains out of the station. The third portion is the remaining portion of the ECMP fluid. In other words, the third portion, which is the selected portion, is the portion between the first portion to enter the drain and the last portion to enter the drain. The third or selected portion is the portion of the used ECMP fluid drained from the ECMP station that is least likely to have rinse water present therein.

Figure 3:
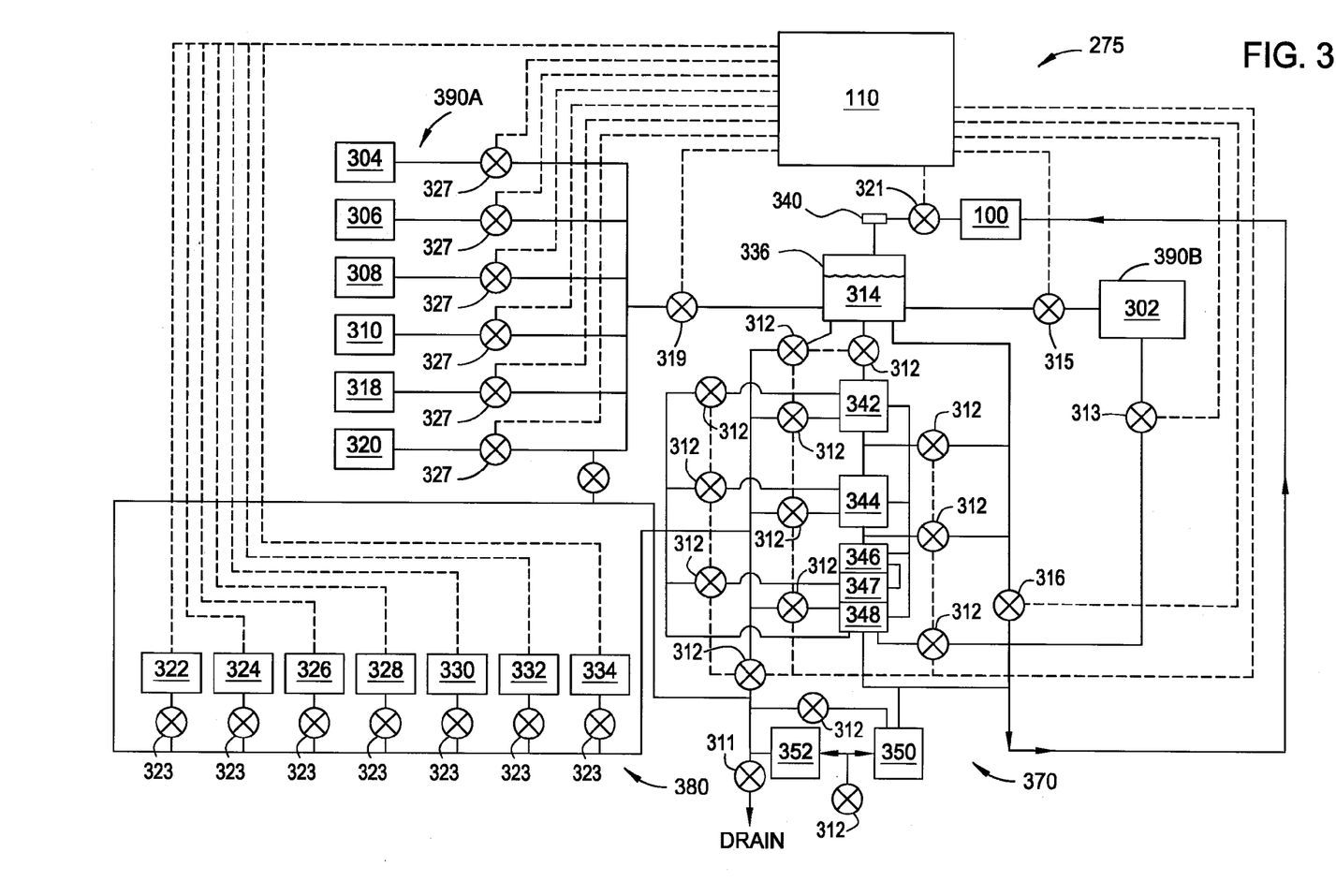
FIG. 3 depicts a schematic representation of a point-of-use treatment unit.

FIG. 3 is a schematic representation of a POU treatment unit 275 configured to provide abatement and/or recycling of a substrate processing fluid. The POU treatment unit 300 may comprise a holding tank 336 wherein an effluent 314 comprising at least a portion of used polishing fluid including chelated metal complexes may collect from the processing system 100. The used polishing fluid may flow through valve 321 to a filter media cell 340 prior to entering the tank 336. The filter media cell 340 is adapted to remove particulates, such as polishing by-products, for example dislodged, torn, or spent portions of the processing pad assembly, and/or abrasive particles from the used polishing fluid. In one embodiment, the filter media cell 340 includes a filter element having perforations with a size of about 100 μm to about 300 μm, and is adapted to remove particulate matter having a size of at least about 100 μm. In another embodiment, the filter media cell 340 comprises a sand media adapted to remove particulate matter having a size of at least about 100 μm. In yet another embodiment, the filter media cell 340 comprises a plurality of microporous filter cartridges adapted to remove particulate matter having a size of at least about 100 μm.

The tank 336 having the effluent 314 therein is coupled to several discrete but integrated devices configured for point-of use treatment of a stream of effluent 314 from the processing system 100. Thus, the processing system 100 and the tank 336 are coupled to a pretreatment device 370, a measurement device 380, and dosing devices 390A, 390B. In some embodiments, the filter media cell 340 is an integral part of the pretreatment device 370. Once the used polishing fluid has entered the tank 336, the effluent 314 may travel through, or be acted on by, one or all of the devices 370, 380, 390A, 390B for recycling and return of at least a portion of the effluent 314 to the processing system 100. The effluent 314 may contain substances used as an ECMP polishing fluid or a CMP polishing fluid in the processing system 100, and at least a portion of the effluent 314 may return to the system 100 for use as an ECMP polishing fluid or a CMP polishing fluid. In some embodiments, the effluent 314 may have been used in the processing system 100 as a CMP polishing fluid, and at least a portion of the effluent 314 returns to the processing system 100 as an ECMP polishing fluid, or vice versa. Pumping devices (not shown) may be coupled to the controller 110 and various conduits of the POU treatment unit 275 to ensure flow of fluids therein. The controller 110 may be electrically coupled with valves 311, 312, 313, 315, 316, 321, 323, and 327 of the POU treatment unit 275 to control flow of fluids therein.

The pretreatment device 370 includes various valves 312 selectively coupling the tank 336 to a first cell 342, a second cell 344, an oxidizing agent cell 346, and optionally an oxidation activation source 348. In some embodiments, the pretreatment device may also include an ion exchange apparatus 350 coupled to a regenerate waste tank 352. A portion of the valves 312 couple the tank 336 to one or more elements of the pretreatment device 370 such that effluent 314 may flow through all elements of the pretreatment device 370, or a selected portion thereof, in any order, either singularly or in combination.

The measurement device 380 may include a Raman spectrometer 322, UV-visible spectrometer 324, infrared spectrometer 326, near-infrared spectrometer 328, index of refraction measurement source 330, a fluid conductivity measurement source 332, and pH measurement source 334, which are selectively coupled by valves 323. In another embodiment, a gas chromatography system or a mass spectrometer may be connected to the measurement device 380. The tank 336 and the pretreatment device 370 are selectively coupled to the measurement device 380 by a portion of valves 312 such that the effluent 314 may flow through any portion of the pretreatment device 370, or bypass the pretreatment device 370 and flow directly to the measurement device 380.

Dosing device 390A may comprise an accelerator source 304, an inhibitor source 306, a surfactant source 308, a wetting agent source 310, an acid source 318, a base source 320, or any other chemical components deemed useful and necessary for refurbishment of the polishing fluid. Each element of the dosing device 390A may be selectively coupled by valves 327. Based upon measurements taken from the measurement device 380, one or more of these chemical components may be added to the selected portion of effluent 314 through the dosing device 390A. Alternatively, should measurements from measurement device 380 reveal that the fluid is not recyclable; the fluid may be drained from the system via actuation of valve 311. As the non-recyclable effluent is drained, the effluent is substantially free from metallic particles and ions, which may facilitate safe disposal of the effluent.

An optional dosing device 390B may also be coupled to tank 336 by valve 315, or to one or more conduits coupled to processing system 100 by valve 313 and/or valve 316. The dosing device 390B includes a virgin polishing fluid source 302 adapted to dose virgin polishing fluid to the tank 336 and/or to an outlet of the tank 336 which leads to processing system 100. The virgin polishing fluid may be combined with the selected portion of effluent 314 after treatment in an amount based upon measurements from the measurement device 380, or the virgin polishing fluid may be combined in a predetermined amount. The controller 100 may be electrically coupled with the measuring devices and the valves 327, 313, and/or 315 to control when the measuring occurs, if at all, what measurements occur, the amount of each component dosed into the polishing fluid, the amount of virgin polishing fluid added to the selected portion of effluent 314, and the amount of refurbished polishing fluid recycled back to the processing system 100.

The first cell 342 and second cell 344 of the pretreatment device 370 are configured to remove organic molecules from, and/or break down chelated metal complexes within the effluent 314. In one embodiment, the first cell 342 comprises a container housing an organoclay media or material. The container may be a tank or enclosure, or include a cartridge type device for easy replacement. The organoclay, sometimes referred to as organic clay, includes silica montmorillonite layered minerals that are modified with tertiary alkyl ammonium molecules, or modified bentonite and/or anthracite and bentonite clays that have been modified with quaternary amines. The organoclay is adapted to remove at least a portion of carbon containing material from the effluent 314. In one embodiment, the first cell 342 includes a volume of organoclay in a ratio of about 1.0 pound per every 0.1 pounds to 2.0 pounds of organic material to be removed from the effluent 314.

The second cell 344 of the pretreatment device 370 is also adapted to remove carbon containing materials, as well as halogen species, from the effluent 314. In one embodiment, the second cell 344 comprises a container housing an activated carbon media or material. The container may be a tank or enclosure housing the activated carbon, or be a cartridge type device adapted for easy replacement. The activated carbon material may be oxygenated charcoal having millions of tiny pores on the surface of the charcoal that function as binding sites. In one embodiment, the activated carbon includes a surface area from about 300 $m^2/g$ to about 2,000 $m^2/g$. In one application, the activated carbon has a surface area greater than about 500 $m^2/g$, such as greater than about 1,000 $m^2/g$. In one embodiment, the activated carbon has an average pore size of between about 1 fm to about 25 fm, such as less than about 15 fm, for example, less than about 10 fm.

In another embodiment, either the first cell 342 or second cell 344 includes a mixture of organoclay and activated carbon, such that a single housing is used for both the first cell 342 and second cell 344. The single housing may include a tank or enclosure housing both media, or may include one or more cartridge devices having the two media disposed therein.

The oxidizing agent cell 346 may also be used alone or in combination with either or both of the first cell 342 and second cell 344 in order to remove organic materials, and/or break down chelated metal complexes within the effluent 314. The oxidizing agent cell 346 includes a container adapted to house and/or dispense an oxidizing agent or a reducing agent. The container may also include a heat source (not shown), and may further be modified to withstand negative or positive pressure, which may be provided by a vacuum source or compressor (both not shown).

In one embodiment, the oxidizing agent cell 346 provides an oxidizing agent to the effluent 314 from an oxidizer source 347. The oxidizer source 347 may contain an oxidizing agent, such as hydrogen peroxide ($H_2O_2$), ozone ($O_3$), permanganate ($MnO_4^-$), nitric acid, or other oxidizers. Hydrogen peroxide may be used to hydrolyze carbon disulfide, carbohydrates, organophosphates, nitrogen compounds, and various polymers and hydrocarbons. Hydrogen peroxide with catalysis removes phenols, solvents, plasticizers, chelators, and substantially all other organic molecules present in the effluent 314. Tests results performed using the oxidizing agent cell 346 and hydrogen peroxide have shown about a 40% reduction in total organic carbon (TOC) levels. Additionally, gas chromatography (GC) tests before and after treatment resulted in about a 70% decrease in the peak intensity of organic foulants.

Although the oxidizing agent cell 346 has been described as providing oxidation agents to minimize organic material, it is also contemplated that a reductant may be provided to the effluent 314, such as a bisulfite compound, for example sodium bisulfate ($NaHSO_4$). The sodium bisulfate serves to loosen bonds between copper and chelating agents. Additionally, the oxidizing agent cell 346 may be in communication with either or both of the first cell 342 and second cell 344 to provide an oxidation agent to the effluent 314 stream.

Optionally, the oxidizing agent cell 346 may be in communication with, and used in combination with, an oxidation activation source 348. The oxidation activation source 348 may include a radiation source or a catalyst surface, which may be disposed in a sealable enclosure. The radiation source may be an ultraviolet (UV) treatment module adapted to provide UV energy to the effluent 314. In one example, the oxidizing agent cell 346 may provide hydrogen peroxide to the effluent 314, and after a time period to allow mixing of the hydrogen peroxide and the effluent, the UV energy source may be directed to the effluent 314 to activate the hydrogen peroxide. This procedure acts to break down larger organic molecules in the effluent 314 stream. In one embodiment, the time period between addition of hydrogen peroxide to the effluent 314 and exposure to the activation source 348 is about 1 second to about 5 seconds.

The oxidation activation source 348 may also include a catalytic surface to provide an oxidation catalyst in a Fenton reaction. The catalytic surface includes a metallic plate, and the effluent 314 stream is adapted to flow over the plate after an oxidizer, such as $H_2O_2$, has been added to the effluent 314 stream. The effluent 314 may be heated, such as by heated conduits, by a heating element integral to, or coupled with the oxidizing agent cell 346, or a combination thereof. Negative pressure may also be provided to one or both of the oxidizing agent cell 346 and oxidation activation source 348 to facilitate the catalytic reaction. In one embodiment, the temperature of the effluent 314 may be about 100° C., and the pressure, at least in the oxidation activation source 348, may be greater than about 1 ATM. Test results using Fenton catalyzed hydrogen peroxide resulted in a 70% reduction of organic materials by TOC. Additionally, GC tests before and after treatment resulted in near complete eradication in the peak intensity of organic foulants, and a gain in organic acid by products.

It is contemplated that any single cell (342, 344, 346) or combinations of cells (342, 344, 346) may be used to treat the effluent stream in any order. For example, the first cell 342, second cell 344, and oxidizing agent cell 346 may operate together or separately to remove organic materials from, and/or break down chelated metal complexes in, the effluent 314, as the flow of effluent 314 may be controlled by a portion of the valves 312. The oxidizing agent cell 346 may also be used alone, or in combination, with any combination of the first cell 342 and second cell 344. Additionally, order the flow path of the effluent stream is not limited to the embodiment shown in FIG. 3. Once substantially all organic materials have been removed by one or a combination of the first cell 342, second cell 344, and oxidizing agent cell 346, the effluent 314 may be flowed to the ion exchange apparatus 350 for removal of metallic ions from the effluent. The pretreatment of the effluent 314 prior to introduction to the ion exchange apparatus 350 prevents or minimizes introduction of organic molecules and foulants to the ion exchange apparatus 350, which may reduce the capacity of the ion exchange apparatus 350 for metallic ions, such as copper.

Figure 4:
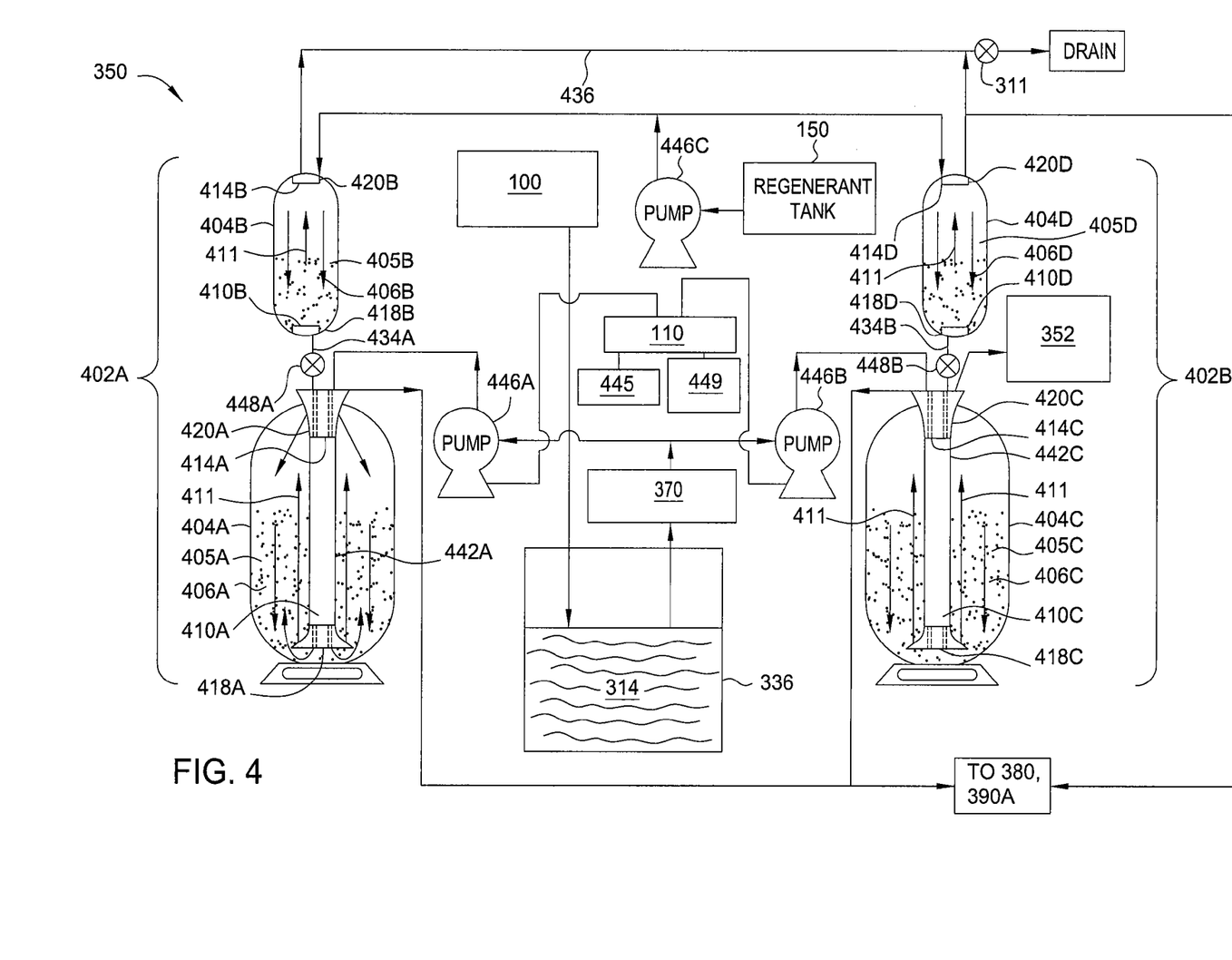
FIG. 4 depicts a schematic view of one embodiment of an ion exchange apparatus.

FIG. 4 is a schematic view of one embodiment of an ion exchange apparatus 350. The ion exchange apparatus 350 includes one or more ion exchange columns 402A, 402B, which can be used to provide a POU waste treatment system for treating effluent 314, and/or provide ion removal for a polishing fluid recycling process. The ion exchange apparatus 350 employs a fully redundant "lead-lag" configuration, in which a plurality of columns 402A, 402B, typically from 2 to 6 columns, are used to provide substantially continuous waste treatment and/or recycling with little or no down time for maintenance. In the version shown, the ion exchange apparatus 350 has two ion exchange columns 402A, 402B that each includes a set of two tanks 404A, 404B and 404C, 404D, respectively. Each tank 404A-404D has a lower port 410A-410D with a bottom diffuser 418A-418D and an upper port 414A-414D with a top diffuser 420A-420D, respectively. The tanks 404A-404D each contain an ion exchange resin bed 405A-405D comprising resin beads 406A-406D capable of exchanging non-hazardous ions for metal or other hazardous ions in the effluent 314. In the tanks 404A and 404C, the lower ports 410A, 410C and bottom diffusers 418A, 418C are in tubes 442A, 442C, respectively, which extend into the tanks, and are configured to contain the resin beads 406A-406C.

The resin beads 406A-406D in each of the tanks 404A-404D comprise an ion exchange resin material that is selected based on the composition of the effluent 314 and, specifically, the presence of metal ions, chelators, and organic foulants that may be present in the effluent 314. For example, the resin beads 406A-406D can comprise ion exchange material selected to have properties that can enhance or impede the removal of particular ions from the effluent 314, for example, ions such as copper, cobalt, tungsten, and other metals. In one application, the effluent 314 stream containing the metal ion complexes is treated using anionic ion exchange resin beads capable of capturing negatively charged molecules and metal complexes. The anion exchange resin beads, which may be formed by epoxypolyamine condensation, comprise a multidentate ligand that chelates the transition metal ions, and thus, preferentially removes the metal ions from, or prevents the formation of, chelated metal complexes, such as EDTA-metal ion complexes.

A multidentate ligand is a ligand whose molecules can form several bonds to a single metal ion. Suitable multidentate ligands comprise amine ligands such as $R-NH(CH_3)_2^+$ and $NR_4^+$, multidentate carboxylate ligands and multidentate hydroxyl ligands. The effluent 314 is exposed to the anionic ion exchange resin beads of the resin bed for from about 30 seconds to about 10 minutes. It is desirable for the resin beads to have an ion exchange capacity per cycle of from about 0.1 kg to about 5 kg of an extracted metal, such as copper.

In one example, the anionic ion exchange resins comprising a multidentate amine ligand, comprises an epoxypolyamine condensation resin made by epoxypolyamine condensation, such as RESINTECH™ WBG30-B, which is a weak base gel type resin that carries a positive charge and is available from Resin Tech, West Berlin, N.J., USA. However, this is only an example of a suitable resin, and other resins fabricated by Dow Chemicals, Bayer, or Rohm & Haas are suitable as would be apparent to one of ordinary skill in the art.

Anion exchange resins comprising a multidentate amine ligand comprise a resin including bis-picolylamine and having multidentate amine groups that form strong bonds with transition metal ions. A suitable bis-picolylamine resin with multidentate amine groups is DOWEX™ M4195 chelating resin which is a styrene-DVB that is macroporous and contains bis-picolylamine. DOWEX™ M4195 is based upon a special chelating amine ligand which is partially quaternized by sulfuric acid as received. When in this conjugate sulfuric acid salt form, the resin is fully swollen and hydrated, and ready for scavenging metal ions from the effluent stream. It is particularly suitable as a chelating resin for copper and can provide a copper loading at an effluent solution pH of about 2, of about 6 gram/L for an effluent flow rate of from about 35 Lpm to about 42 Lpm.

The anionic ion exchange resins have several unique advantages when removing transition metal ions from the effluent solution. For example, the anion exchange resins allow the anionic organometallic complexes containing transition metals, particularly EDTA copper complexes, to be removed from the effluent with high efficiency. The anion exchange resins also remove EDTA copper complexes as well as other organometallic complexes. Unexpectedly, anionic ion exchange resins have the further advantage of removing organic acids and complexants to provide a treated effluent that is free of toxic copper and other materials that can disrupt other treatment downstream from the ion exchange process. Furthermore, the effluent from substrate treatment processes, such as ECMP, often carry a preponderance of negatively charged species involved in the complexing copper ions as well as in the buffering of the fluid. Advantageously, the anionic ion exchange resins trap these species to destroy the buffering capacity of these fluids, while also removing copper in the form of the EDTA complexes and other complex compounds, which are negatively charged at the pH values used for ECMP treatment solution. The Cu-EDTA compound exists as a doubly negative complex which can be removed by anionic ion exchange resins.

Yet another advantage arises because the anionic ion exchange resins capture citrate anions, as H2L-, HL2-, and L3-, thereby removing these compounds from the effluent. The ECMP effluent contains a significant amount of citrate anions which form citrate complexes with the transition metal ions present in the effluent. It is undesirable to release such citrate complexes into the sewer systems as they serve as a source for biological growth resulting in promoting undesirable biological growth in these waters.

In yet another version, selective cationic ion exchange resins that capture doubly charged transition metal cations, such as copper, are used to remove the copper from the effluent stream. In this version, a combination of anion exchange resin beads and cation resin beads are used to remove both potentially harmful organic materials and copper ions in one ion exchange system and in one cycle. The anion and cation resin beads can be maintained in separate or segregated resin beds in different tanks, or combined into a single mixed resin bed.

In one embodiment, it was determined that a resin bed which fills up a large enclosed volume of the tank with the resin beads provides better ion exchange than a fluidized resin bed. Conventionally, a small volume of typically less than about 60% of the tank is filled with the resin beads to allow the resin beads to fluidize to form a fluidize resin bed which allows movement and rotation of the resin beads to allegedly provide better and more consistent ion exchange. Also, many resin beads swell upon contact with water and having a relatively small volume resin bed within the tank provides the resin beads with empty space in which to expand upon contact with water.

However, counter intuitively, it was determined that that optimal results were obtained when the resin bed within the enclosed volume of the ion exchange tank contained a larger amount of anion exchange resin beads, for example, sufficient to fill a volume of at least about 75% of the enclosed volume of the tank. This is because the larger fill volume of the resin bed allowed the resin beads to pack tightly against one another and against the upper diffuser as result of the upward pressure of effluent passing through the tank in an upflow direction (in an upward flow direction opposing gravity).

A tightly packed resin bed also creates a more convoluted and tortuous flow path for the effluent 314 through the resin beads within the bed. The increased path length and exposure to the larger total surface area of resin beads provides more efficient extraction of transition metal ions from the effluent. Furthermore, it was also determined that packing in the resin beads to form a resin bead that has a larger fill volume in the tank, effectively reduces sporadic variations in metal ion content that previously arose in the treated effluent. It is surmised that excessive fluidization of a resin bed occasionally resulted in randomly generated positions of resin beads which created a short flow path through the tank at that particular time. The formation of very short flow path lengths through the resin beads, which allowed at least some of the effluent to rapidly flow through the resin bed, transports this effluent stream through the tank without complete ion exchange of the transition metal ions in the effluent stream. The greater amount of resin beads also the added advantage of a much greater total ion exchange capacity. Also, the upflow of substrate processing effluent 314 through the resin bed allows any particles which may be present in the substrate processing effluent 108 to separate out and flow downwards due to gravitational forces.

However, when swelling resin beads are used in the resin bed, the resin bed should not completely fill the enclosed tank, as this may cause the resin beads to crush against each other and thereby prevent the passage of effluent through the beads. Thus, the resin bed should contain a sufficient amount of resin beads to fill a volume of less than about 90% of the enclosed volume of the tank. This creates an empty volume in the tank of at least about 10% above or under the resin bed, depending on the direction of flow of the effluent within the enclosed volume of the tank. The empty volume allowed for swelling resin beads to expand, and also allowed some movement of the resin beads caused by the passage of the effluent stream through the resin beads. The total volume of the tank is typically at least about 2 $ft^3$, and more typically from about 1 $ft^3$ to about 4 $ft^3$. The tank was made of polyester and provided by Pentair of Golden Valley, Minn.

In another embodiment of the use of all or any of the ion exchange tanks 404A-404D shown in FIG. 4, the effluent 314 may be passed downwards through the tank in a down flow direction (in a downward flow direction with gravity). This version is useful when the effluent does not contain a large amount of solid particulates. For example, effluent 314 from an electrochemical plating process (ECP) has little or no particulates and is substantially only composed of metal ions, and organics. In this application, the ion exchange tank also can contain a larger amount of anionic ion exchange resin beads, for example, sufficient to fill a volume of at least about 75% of the enclosed volume of the tank. However, the down flow of the effluent operates in conjunction with the force of gravity to form a resin bed in which the resin beads are packed tightly against the bottom diffuser. The packed resin bed creates an even more tortuous flow path for the effluent through the resin beads exposing a larger total surface area of resin beads to provide good extraction of transition metal ions from the effluent. The larger amount of resin beads also has the added advantage of a much greater total ion exchange capacity.

In another aspect, which can be used in combination with the other aspects or independently, it was determined that a resin bed comprising a mono-dispersion of resin beads provides better ion exchange process than a poly-dispersion of resin beads. A mono-dispersion is a dispersion of resin beads having substantially the same size, for example, substantially the same diameter or area. When the dispersion of resin beads are substantially the same size, the beads may be tightly packed together against the wall of the tank, and because the resin beads are all substantially the same size, a continuous gap space between the resin beads is formed, which also has a substantially uniform size. As a result, the pathway through the mono-dispersion of resin beads provides a plurality of uniformly sized tortuous flow paths that increase the ion exchange extraction efficiency from the effluent solution. In one version, the mono-dispersion of resin beads comprises resin beads having an average diameter of from about 0.1 μm to about 10 µm, or even from about 0.3 µm to about 1.0 µm, such as from about 0.6 µm to about 1.0 µm.

In each of the ion exchange columns 402A, 402B, the tanks 404A and 404C serve as main tanks, and the tanks 404B and 404D serve as polisher tanks. The polisher tanks 404B, 404D are located downstream of, and are fluidly connected to, the main tanks 404A, 404C via the conduits 434A, 434B, respectively. In this system, effluent 314 is passed through a first column 402A for treatment while the second column 402B is being regenerated and vice versa. In each column 402A, 402B, the main tanks 404A, 404C remove the bulk of the metal or other undesirable ions, and the polisher tanks 404B, 404D further reduce the metal ion concentration in the effluent 314 outputted from the main tanks 404A, 404C by more than an order of magnitude, while also removing trace elements present in the effluent 314. The columns 402A, 402B with the combined system of polisher tanks 404B, 404D and main tanks 404A, 404C provide a copper concentration in the treated slurry 112 of less than about 0.5 ppm, and even less than about 0.2 ppm, and typically from about 0.1 ppm to about 0.2 ppm. The capacity per cycle of each column 402A, 402B ranges from about 0.1 kg to about 5 kg of extracted copper, depending on the chemistry of the incoming substrate processing effluent 314 and the ion exchange capacity of the columns 402A, 402B.

The ion exchange apparatus 350 further comprises a controller 110, which may be the same controller shown in other Figures, or may be a sub-controller tied to a master controller. The controller 110 may be remotely located in a control panel or control room and controlled with remote actuators. The controller 110 may be a microcontroller, microprocessor, general-purpose computer, or any other known applicable type of computer. The controller 110 typically comprises a suitable configuration of hardware and software to operate the components of the ion exchange apparatus 350. For example, the controller 110 may comprise a central processing unit (CPU) that is connected to a memory and other components. The CPU comprises a microprocessor capable of executing a computer-readable program. The memory may comprise a computer-readable medium such as hard disks, optical compact disc, floppy disk, random access memory, and/or other types of memory. An interface between a human operator and the controller 110 can be, for example, via a display 445, such as a monitor, and an input device 449, such as a keyboard. The controller 110 may also include drive electronics such as analog and digital input/output boards, linear motor driver boards, or stepper motor controller boards.

The controller 110 may be used to control valves to regulate effluent from the substrate processing system 100. During an ion exchange cycle, the controller 110 operates either one of the pumps 446A, 446B to pass an upflow of effluent 314 through either one of the columns 402A, 402B to exchange non-hazardous ions for metal or other hazardous ions from the effluent 314.

For example, in an ion exchange cycle, the controller 110 can operate the pump 446A to pump effluent 314 from the tank 336 to the ion exchange column 402A. The column 402A receives the substrate processing effluent 314 through the tube 442A, and the effluent 314 passes through the bottom diffuser 418A to exit the lower port 410A into the tank 404A. The effluent 314 passes across the tank 404A as an upflow (in an upward flow direction opposing gravity) through the resin beads 406A of the resin bed 405A, exits through the top diffuser 420A, and then passes through the conduit 434A to the polisher tank 404B. The upflow is provided at a flow rate sufficient to fluidize the resin bed 405A to assist in the interaction of metal ions and the ion exchange surface of the resin beads 406A while allowing resin beads flow downwards in the tank 404A due to gravity. Most of the metal in the effluent 314 may be extracted by the resin beads in the tanks 404C, 404D at this stage.

After treatment in the main tank 404A, the effluent 314 is passed to its associated downstream polisher tank 404B, which removes residual traces of undesirable ions and compounds. The effluent 314 stream enters the polisher tank 404B through the lower port 410B via the bottom diffuser 418B, upflows through the resin beads 406B of the resin bed 405B and exits the upper port 114b through the top diffuser 420B to the drain conduit 136 which takes treated slurry to drain by actuation of valve 311. By having two different ion exchange columns 402A, 402B, each comprising a main tank 404A, 404C and a polisher tank 404B, 404D, when column 402A needs to be regenerated, column 402B is used for ion exchange and vice versa. Operation of column 402B is the same as operation of column 402A and will not be repeated for brevity.

As one example, substrate processing effluent 314 containing copper ions was treated in columns 402A, 402B. The copper removal efficiency of the main tanks 404A, 404C was found to be typically above about 95%, and the polisher tanks 404B, 404D, installed downstream of the main tanks 404A, 404C, further reduce the copper concentration by more than an order of magnitude, resulting in an overall copper concentration in the treated slurry of less than from about 0.2 ppm, or even less than from about 0.1 ppm. The ion exchange capacity per cycle allows removal of from about 100 g to about 5 kg of copper, depending on the chemistry of the substrate processing effluent 314 and the capacity of the tanks 404A-404D. In one version, the main tanks 404A, 404B reduce the pH level of the effluent 314, being treated by at least about 0.3, and more typically from about 0.4 to about 0.7. The lower pH level of the slurry passed into the polisher tanks 404B, 404D, allow the resin beads 406B-406D in the polisher tanks 404B, 404D to more efficiently extract ions from the effluent 314 as the reduced pH level improves the ion exchange capacity of the resin beads 406B-406D. In this manner, the entire column 402A or 402B functions more efficiently with two tanks.

The controller 110 switches operation from ion exchange treatment to regeneration of columns 402A, 402B automatically upon receiving a signal from detectors 448A, 448B, which indicate detection of high levels of metal, such as copper, in the treated or partially treated effluent 314. The detectors 448A, 448B can be pH level detectors to detect when the treated stream emanating from one of the tanks 404A-404D has an excessively high pH level. The detectors 448A, 448B can also be metal concentration detectors to detect an excessively high level of metal, such as copper, in the treated slurry. In one version, the detectors 448A, 448B are located between the main tanks 404A, 404C and the polisher tank 404B, 404D so that exhaustion of the resin beads 406A, 406C in the main tanks 404A, 404C can be detected prior to the exhaustion of the resin beads 406B, 406D in the polisher tanks 404B, 404D. This provides the further advantage of reducing the chances of metal ion breakthrough wherein substrate processing effluent containing excessively high levels of metal is released into the external environment. A suitable detector 448A, 448B to detect copper levels in the treated slurry comprises a colorimetric copper analyzer, for example, a dual cell TYTRONICS™ model manufactured by Galvanic Applied Sciences of Lowell, Mass.

In one example, the controller 110 switches to regeneration when it detects a steep increase in copper concentration measured in the treated effluent 314 emanating from top diffuser 420A of the main tank 404A, for example, an increase of about 10 times the concentration of copper in the treated effluent per 100 gallons of effluent flowing through the tank 404A, which is an increase of an order of magnitude. At this time, the main tank 404A is switched over to regeneration mode to regenerate the ion exchange capability of the resin beads 406A in the tank 404A, and the effluent 314 is passed thought the main tank 404C of the second column 402B for ion exchange. Thus, the controller 110 switches flow of the slurry from the first column to the second column upon detecting about a 10 fold increase in copper concentration per 100 gallons of effluent flow in the treated effluent emanating from the upper port of the first column 402A. The controller 110 can also be programmed to switch flow of the effluent from the first column 402A to the second column 402B upon detecting a change in pH level of the effluent of less than about 0.5 after the effluent exits the main tank of the first column 402A.

In the regeneration mode, the metal ions, for example, copper ions entrapped in the resin beads 406A, are stripped off the resin when the pH of regenerant is within the range of from about 0.6 to about 0.8. During the regeneration cycles, the controller 110 controls the pump 446C and a valve to pass regenerant solution from the regenerant tank 450 through the resin tanks 404A-404D via their respective ports to regenerate the resin beads 406A-406D. The ion exchange apparatus 350 can also have a regenerant tank 450 which contains a regenerant, such as a dilute acid solution, for example, sulfuric acid diluted with water, which is passed through the resin beads 406A-406D in the tanks 404A-404D. An acid supply (not shown) may provide additional acid to the regenerant tank 450. The dilute sulfuric acid is used to generate a low pH solution for resin regeneration. As one example, the regenerant flow rate is set at about 1 gallon per minute (gpm) to provide enough time for the resin beads 406A-406D to exchange metal ions for protons. Upon the completion of the regeneration cycle, the tanks 404A-404D can be flushed with deionized water to remove residual acid remaining in the resin beads 406A-406D. The regenerant tank 450 can have a volume of from about 10 gallons to about 118 gallons.

Figure 5:
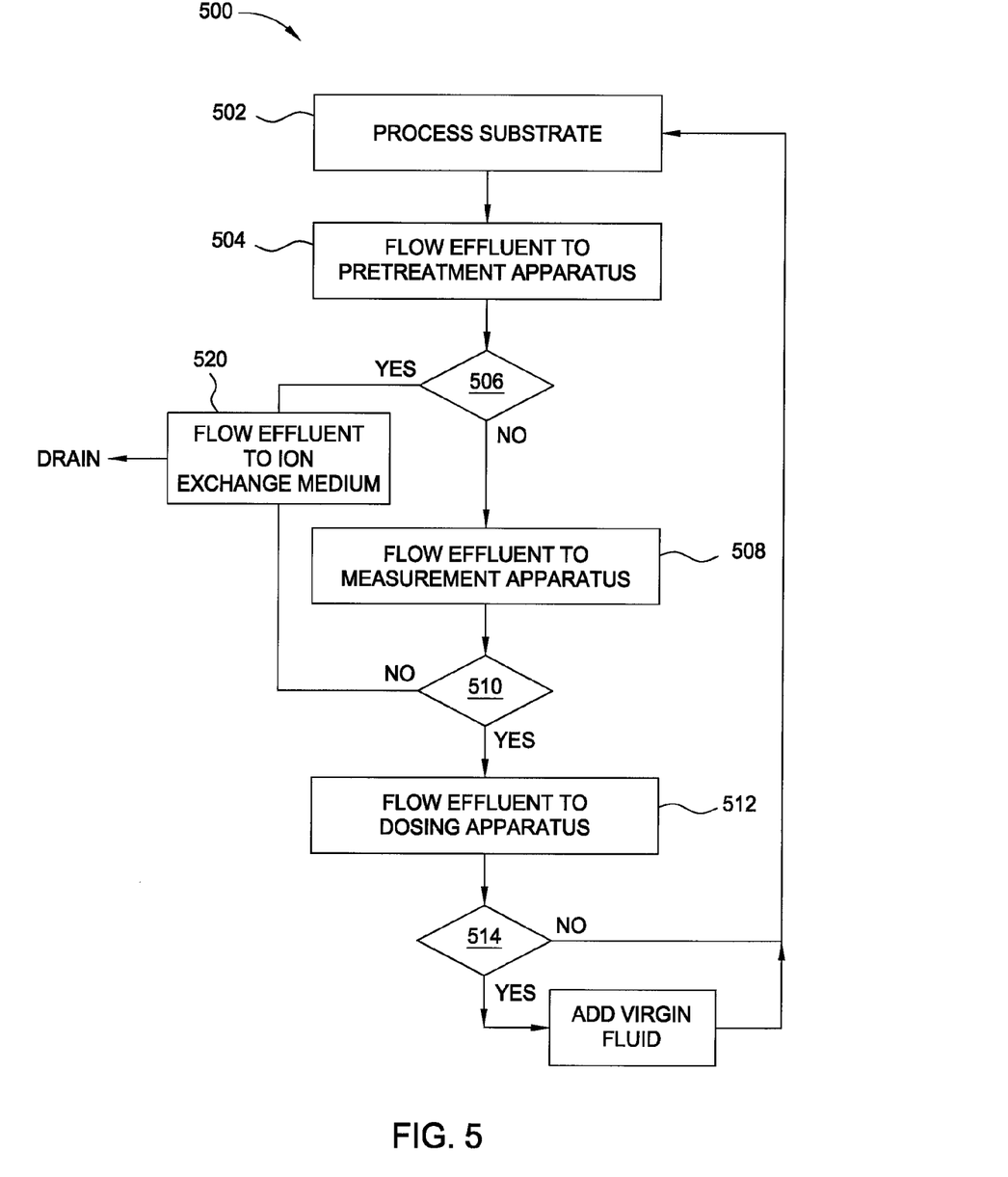
FIG. 5 illustrates a flow chart of one embodiment of a polishing fluid treatment cycle.

FIG. 5 is a flow chart 500 of one embodiment of a polishing fluid treatment cycle. At step 502, one or more substrates may be processed at one or more of the polishing stations 120A-120C of the polishing module 108 of FIG. 1. At 504, the polishing fluid used in one or a combination of the polishing stations 120A-120C may be flowed to a pretreatment apparatus, which includes any permutation of the pretreatment apparatus 370 shown in FIG. 3. For example, any one or combination of filter media cell 340, first cell 342, second cell 344, and oxidizing agent cell 346. It is contemplated that the used polishing fluid flowed from the polishing station(s) may be caused to flow to the pretreatment apparatus 370 during a polishing cycle as new polishing fluid (e.g., virgin fluid, recycled fluid, or a combination thereof), is supplied to the polishing station in a real-time manner, or alternatively, the polishing cycle performed at the station(s) may be complete, and used polishing fluid may be stored temporarily, such as by tank 336, until introduction to the pretreatment apparatus 370.

At 506, the user may determine the effluent stream is to be abated. If the effluent is to be abated, the effluent may be flowed to ion exchange apparatus 350 to remove metals from the effluent and drained. Also at 506, if the user desires to recycle the effluent, 508 reflects flowing the effluent to measurement apparatus 380 for analysis. After analysis by measurement apparatus 380, 510 indicates a user decision based on analytical data to determine whether the effluent will be recycled or abated. In the case of abatement, the effluent may be flowed to ion exchange apparatus 350 to remove metals from the effluent and drained. In the case of recycling, 512 reflects flowing the effluent to dosing apparatus 390A for rehabilitation. 514 indicates a decision as to whether the rehabilitated effluent needs any added portions of virgin polishing fluid. If affirmative, dosing apparatus 390B adds a selected amount of virgin polishing fluid to the treated effluent, and the treated effluent and virgin polishing fluid is flowed to the polishing module 108. If the query at 514 is negative, the treated effluent is flowed to the polishing module 108 without any additional fluid from the dosing apparatus 390B.

Figure 6:
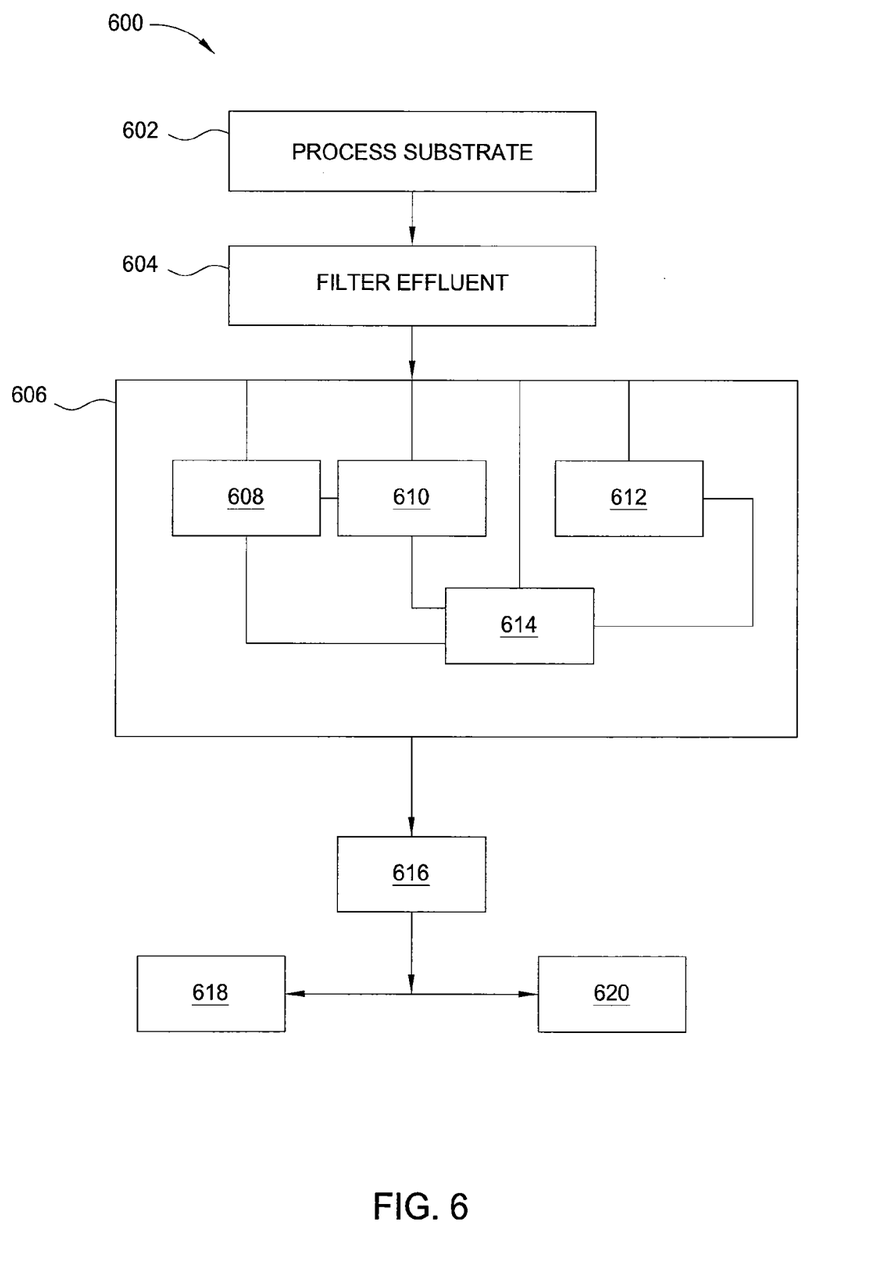
FIG. 6 illustrates a flow chart of another embodiment of a polishing fluid treatment cycle.

FIG. 6 is a flow chart of another embodiment of a polishing fluid treatment cycle. At 602, one or more substrates may be processed at one or more of the polishing stations 120A-120C of the polishing module 108 of FIG. 1. 604 indicates filtering of the used polishing fluid or effluent through filter media cell 340. At 606, the effluent is introduced to a pretreatment apparatus, such as pretreatment apparatus 370 as described in FIGS. 3 and 4. Once the effluent is introduced into pretreatment apparatus, the effluent stream may be flowed to any one or combination of 608, 610, and 612, wherein 608 indicates an organoclay medium, 610 indicates an activated carbon medium, and 612 indicates a mixture of organoclay and activated carbon. 614 indicates an oxidation agent source that may provide an oxidizing agent to any one or combination of 608, 610, and 612. After the effluent stream is flowed through pretreatment apparatus at 606, the effluent may be flowed to an ion exchange medium at 616. The ion exchange medium may be configured as described in FIGS. 3 and 4, and is adapted to scrub metal ions from the effluent for disposal at 620, or rehabilitation at 618.

In an alternative embodiment, once the ECMP fluid is removed from the ECMP station, it may be placed in a holding tank for later recycling or sent directly to a POU treatment unit for refurbishing prior to reuse. The refurbished ECMP fluid may be used with the same platen or may be used on a different platen. For example, when using the ECMP tool shown in FIG. 1, the ECMP fluid recycled from the first ECMP station 128 may be used on the second or third ECMP stations 130, 132. Recycled ECMP fluid from the second and third ECMP stations 130, 132 may be used in a similar manner. In one embodiment, the recycled ECMP fluid is used within the same ECMP station from which the used ECMP fluid was drawn.

ECMP fluids may be recycled easier than CMP slurries because slurry particle homogeneity, concentration, and size distribution, which are critical components for the CMP slurry, are not critical to ECMP fluids. In CMP slurries, it is difficult to make the particle homogeneity, concentration, and size distribution of a recycled CMP slurry sufficiently match a virgin CMP slurry. Careful filtration, copper removal, and chemical reconstitution may be necessary to ensure that a recycled copper CMP slurry sufficiently meets the requirements achieved by the virgin copper CMP slurry. The byproducts and the dilution of the CMP slurry may determine the ability and effects of recycling.

ECMP fluids, on the other hand, may contain less than 1% solids. When polishing copper, the copper is removed using the ECMP fluid by electrochemical deplating and thus, may not depend upon the abrasive particle concentration, homogeneity, and size distribution. After polishing, the ECMP fluid may comprise a mixture of highly buffered aqueous ionic electrolyte and some suspended solids from a buffing process that may occur after the ECMP process or hybrid ECMP processes that include abrasives or further steps utilizing some abrasives. The used ECMP fluid may contain buffering agents, inhibitors, surfactants, metal complexing agents, and some copper. In one embodiment, the amount of copper is less than about 100 ppm.

ECMP fluids may be recycled by filtration, copper removal, chemical reconstitution, water stripping, and combinations thereof. Positioning an ECMP POU treatment unit on site for immediately reuse and recirculation of the ECMP fluid may be beneficial. In one embodiment, an ECMP POU treatment unit may be coupled with the ECMP tool to recycle and refurbish the ECMP fluid directly after use. In another embodiment, the ECMP fluid may be removed offsite and refurbished and recycled for use at a later time in the same or a different ECMP tool.

The amount of copper present in the ECMP fluid may be measured to determine whether or not the copper concentration is below a predetermined threshold value. If the copper content is above the threshold value, then the copper may be removed by ion-exchange, precipitation, absorption onto other media, electrochemical reduction, and the like. In order to ensure copper cations are captured and removed while other cations remain, chelating agents and copper specific ion-exchange resins may be used. If additional cations besides the copper cations are removed, the chemical make-up of the ECMP fluid may change and thus, render the recycled ECMP fluid unsuitable for use within the desired ECMP fluid mixture. In such a situation, the ECMP fluid may need to be dosed with additional chemical components to refurbish the ECMP fluid. In one embodiment, potassium containing chelating and/or buffering agents may be used. In another embodiment, ammonium chelating and/or buffering agents may be used. Copper specific chelating resins that may be used include resins that uptake a transition metal ion over a Group 1 or Group 2 cation and may be purchased from suppliers such as ResinTech, Dow, Purolite, Bayer, Rohm & Haas, and others. Specific resins that may be used include iminodiacetic (IDA), aminophosphonic, and bis-picoly-lamine.

In one embodiment, a copper cation may be exchanged with a resin that is proton based, sodium based, potassium based, or ammonium based. For example, by exchanging two protons for one copper 2+ ion, the pH of the ECMP fluid may eventually be lowered. The main point of the ion-exchange mechanism for copper removal is that the chemical entity that is exchanged for the copper cation does not negatively impact the ECMP fluid for reuse.

The ECMP fluid may be refurbished by adjusting the pH of the fluid. The pH of the ECMP fluid may be measured (as discussed below) and then an appropriate amount of base or acid may be selectively dosed into the ECMP fluid to change the pH of the ECMP fluid to the desired value. The addition of pH buffering agents such as citric acid or phosphoric acid for the control of pH within a desired range or at a fixed value may be desired.

In one embodiment, the ECMP fluid may be refurbished by adding specific chemicals to the fluid. Accelerators, inhibitors, surfactants, wetting agents, and other chemicals may be selectively added to the ECMP fluid in sufficient quantity to enable the used EMCP fluid to obtain the chemical properties and concentration present in a virgin ECMP fluid. The individual components may be selectively added or dosed into the selected portion of used ECMP fluid based upon the measured chemical concentration of the components in comparison with the predetermined chemical concentration present in the virgin ECMP fluid. Once the measured concentration is compared to the predetermined concentration, the necessary amount of chemical component to be added to the selected portion of used ECMP fluid is known. In one embodiment, no measuring occurs and a predetermined amount of selected components are dosed into the selected portion.

In one embodiment, the used ECMP fluid may be refurbished by adding a predetermined amount of virgin ECMP fluid to the selected portion. In one embodiment, the virgin ECMP fluid may be added to the selected portion in an amount based upon a comparison of the measured chemical component concentration of the ECMP fluid to the virgin ECMP fluid. The virgin ECMP fluid may dilute any copper present in the selected portion of used ECMP fluid and also provide fresh chemical components to the ECMP fluid for further use. In one embodiment, no measuring occurs and a predetermined amount of virgin ECMP fluid is dosed into the selected portion.

The concentration of the components that are present in the ECMP fluid may be determined by a measurement device integrated with the ECMP recycle station. The measuring may take place before ECMP processing, after ECMP processing, or both. By measuring both before and after processing, the states of the before and after EMCP fluids may be compared to ensure efficacy of fluid processing and/or prequalification of the ECMP fluids and/or identification of any undesired chemical components that may negatively impact the ECMP process. The measurement that occurs after processing may be compared to a predetermined concentration to determine how much of an individual component may be dosed into the selected portion of used ECMP fluid. Examples of chemical properties and measurements that may occur include total organic carbon concentration, pH, conductivity, copper concentration, total suspended solids, turbidity, and others. The measurements may be made by Raman spectroscopy, UV-visible spectroscopy, infrared spectroscopy, near-infrared spectroscopy, index of refraction, and other well known measurement processes.

The ECMP fluid may be recirculated through a loop or alternate pathway until it is reused. When in the recirculation loop or pathway, filtration, abatement, reconstitution, metrology, or other processed may be performed on the fluid to optimize the physiochemical characteristics of the fluid. The fluid may be reprocessed in a batch mode or in a tank or in a continuous mode.

In one embodiment, a process sequence may proceed as follows. A substrate is initially provided to a first platen of a first ECMP station within an ECMP tool having at least two separate ECMP stations. An ECMP fluid may then be provided while the substrate is polished in a bulk polishing step. After the bulk polishing has been completed, the used ECMP fluid may be drained from the first ECMP station and a selected portion of the used ECMP fluid may be captured. The selected portion of used ECMP fluid from the first ECMP station may be measured to determine the copper concentration, the contaminant concentration, and starting material concentration, the conductivity, and/or the pH. Simultaneously, the first ECMP station may be rinsed with deionized water. Following the measuring, the selected portion of used ECMP fluid may be refurbished by stripping copper, removing contaminants, diluting the ECMP fluid with unused fluid, and/or selectively dosing the selected portion of used ECMP fluid with individual components of the ECMP fluid. The substrate may then be moved to the second ECMP station where unused ECMP fluid and at least a portion of the recycled ECMP fluid from the first ECMP station are provided for polishing. The substrate is then polished to remove residual material not removed in the bulk removal process. During the polishing of the substrate at the second ECMP station, another substrate is being processed at the first ECMP station in a manner as described above. A selected portion of ECMP fluid from the second ECMP station may then be drained to the same POU treatment unit as was used to recycle the ECMP fluid from the first station where it is processed in a manner as described above. The selected portion of used ECMP fluid from the second ECMP station may then be measured as described above and combined with selected portions of used fluid from the first ECMP station. Thereafter, the combined selected portions of used ECMP fluid may be processed and supplied to both the first and second ECMP stations as further substrates are processed.

In another embodiment, a process sequence may proceed as follows. A substrate may be provided to a first ECMP station of an ECMP tool having at least two separate ECMP stations. A first ECMP fluid may be provided to the first ECMP station to polish the substrate. Thereafter, a selected portion of the used ECMP fluid may be drained to a POU treatment unit and may be measured to determine the copper concentration, the contaminant concentration, and starting material concentration, the conductivity, and/or the pH. Simultaneously, deionized water may be provided to the first ECMP station to rinse the first ECMP station. The selected portion of used ECMP fluid from the first ECMP station may be refurbished in a manner described above. The substrate may be moved to a second ECMP station where a second ECMP fluid may be provided to polish the substrate. A selected portion of used ECMP fluid from the second ECMP station may be recycled in a manner similar to that performed on the selected portion of used ECMP fluid from the first ECMP station, but the selected portion of used ECMP fluid from the second ECMP station may be recycled in a separate POU treatment unit. When the substrate is moved to the second ECMP station, another substrate may be provided to the first ECMP station and the recycled ECMP fluid from the first ECMP station, in addition to unused first ECMP fluid may be provided to the first ECMP station. After both substrates have been processed, the first ECMP fluid may again be recycled to the first ECMP station while the substrate is moved to the second ECMP station where it is polished with a combination of recycled second ECMP fluid and unused second ECMP fluid.

In still another embodiment, a process sequence may proceed as follows. A substrate may be provided to an ECMP station. A first ECMP fluid may be provided to the ECMP station to polish the substrate. After the polishing, a selected portion of the first ECMP fluid may be drained into a first POU treatment unit where it may be recycled as described above. After the selected portion of ECMP fluid is drained, deionized water may be provided to the ECMP station to rinse the station. Thereafter a second ECMP fluid, different from the first ECMP fluid, may be provided to the ECMP station to polish the substrate. Thereafter, a selected portion of the second ECMP fluid may be drained to a second POU treatment unit where it may be recycled as described above. Thereafter, the substrate may be removed and the ECMP station may again be rinsed. A second substrate may then be provided to the ECMP station. The second substrate may be polished with unused first ECMP fluid and recycled ECMP fluid. A selected portion of the used ECMP fluid may then be drained from the ECMP station and recycled as described above. The ECMP station may be rinsed with deionized water. The substrate may then be polished with unused second ECMP fluid and recycled second ECMP fluid. A selected portion of the used ECMP fluid may then be drained and recycled again as described above.

In yet another embodiment, a process sequence may proceed as follows. A substrate may be provided to an ECMP station. A first ECMP fluid may be provided to the ECMP station to polish the substrate. After the polishing, a selected portion of the first ECMP fluid may be drained into a POU treatment unit where it may be recycled as described above to match the characteristics of a second ECMP fluid. After the selected portion of ECMP fluid is drained, deionized water may be provided to the ECMP station to rinse the station. Thereafter the second ECMP fluid, different from the first ECMP fluid, may be provided to the ECMP station along with the recycled ECMP fluid to polish the substrate. Thereafter, a selected portion of the second ECMP fluid may be drained to the POU treatment unit where it may be recycled as described above to match the characteristics of the first ECMP fluid. Thereafter, the substrate may be removed and the ECMP station may again be rinsed. A second substrate may then be provided to the ECMP station. Thereafter, a second substrate may be polished with unused ECMP fluid and recycled ECMP fluid in a manner similar to that described above in relation to the first substrate.

Embodiments have been described above in relation to ECMP fluids, but it should be understood that the other embodiments of the invention are equally applicable to hybrid ECMP fluids wherein hybrid ECMP fluids contain abrasive particles in the fluid. When using hybrid ECMP fluids, replenishment may additionally involve separating out the abrasive particles. The hybrid ECMP fluids should be drained from a separate drain than ECMP fluids that do not contain abrasive particles so that abrasive particles do not intermix with ECMP fluids that do not contain abrasives. Intermixing may contaminate the ECMP fluids that do not contain abrasive particles.

Thus, an ECMP fluid may be recycled and refurbished to be used multiple times. Recycling and refurbishing the ECMP fluid may provide a seasoning affect so that the recycled and refurbished ECMP fluid may operate more effectively and efficiently than a virgin ECMP fluid. By recycling selected portions of used ECMP fluid, ECMP processing may proceed in a more efficient manner.

While the foregoing is directed to some embodiments of the invention, other and further embodiments of the invention may be devised without departing from the basic scope thereof, and the scope thereof is determined by the claims that follow.

The invention claimed is:

1. An apparatus for treating a waste chemical mechanical polishing (CMP) fluid or a waste electrochemical mechanical polishing (ECMP) fluid used in a substrate processing system, comprising:
   a conduit system configured to be coupled to the substrate process system to received the waste CMP fluid or ECMP fluid from the substrate process system;
   a holding tank containing a supply of waste CMP fluid or ECMP fluid coupled to the conduit system;
   an oxidizing agent cell coupled to the conduit system and in fluid communication with an oxidizing agent source, wherein the oxidizing agent cell is configured to provide an oxidizing agent to the waste CMP fluid or ECMP fluid from the oxidizing agent source to break down chelated metal complexes in the waste CMP fluid or ECMP fluid and to remove organic materials from the waste CMP fluid or ECMP fluid;
   an organoclay filter cell coupled to the conduit system and comprising an organoclay media, wherein the organoclay filter cell is configured to remove carbon containing material from the waste CMP fluid or ECMP fluid;
   an active carbon filter cell coupled to the conduit system and comprising an active carbon media, wherein the active carbon filter cell is configured to remove carbon containing materials and halogen species from the waste CMP fluid or ECMP fluid; and a resin column coupled to the conduit system and comprising an anion exchange resin, wherein the anion exchange resin is configured to remove metallic ions from the waste CMP fluid or ECMP fluid.

2. The apparatus of claim 1, further comprising a filter media coupled to the conduit system and in fluid communication between the substrate process system and the organoclay filter cell, wherein the filter media is configured to remove polishing by-products from the waste CMP fluid or ECMP fluid.

3. The apparatus of claim 1, further comprising an ultraviolet treatment module in communication with the oxidizing agent cell configured to provide UV energy to the waste CMP fluid or ECMP fluid to activate the oxidizing agent and to break down large organic molecules in the waste CMP fluid or ECMP fluid.

4. The apparatus of claim 1, wherein the oxidizing agent cell is positioned downstream from the organoclay filter cell.

5. The apparatus of claim 1, wherein the organoclay filter cell is positioned upstream from the activated carbon filter cell.

6. The apparatus of claim 1, wherein the conduit system is configured to return at least a portion of the waste CMP fluid or ECMP fluid to the substrate processing system.

7. The apparatus of claim 6, further comprising a measurement device coupled to the conduit system, wherein the measurement device is configured to determine whether the waste CMP fluid or ECMP fluid is recyclable.

8. The apparatus of claim 7, further comprising a regenerate waste tank coupled to the resin column.

9. The apparatus of claim 7, further comprising a dosing device coupled to the conduit system, wherein the dosing device is configured to refurbish the waste CMP fluid or ECMP fluid for polishing.

10. The apparatus of claim 1, wherein the anion exchange resin comprises two ion exchange columns, each ion exchange column comprising:

a main tank coupled to the conduit system, wherein the main tank is configured to remove a bulk of metal ions in the waste CMP fluid or ECMP fluid; and a polisher tank located downstream of the main tank and fluidly connected to the main tank, wherein the polisher tank is configured to remove additional metal ions present in the waste CMP fluid or ECMP fluid.

11. The apparatus of claim 10, wherein the metal ions are copper.

* * * * *